(12) United States Patent
Sommerer

(10) Patent No.: US 6,701,348 B2
(45) Date of Patent: Mar. 2, 2004

(54) METHOD AND SYSTEM FOR AUTOMATICALLY UPDATING CONTACT INFORMATION WITHIN A CONTACT DATABASE

(75) Inventor: Peter Sommerer, Kanata (CA)

(73) Assignee: GoodContacts.com, Ottawa (CA)

( * ) Notice: Subject to any disclaimer, the term of this patent is extended or adjusted under 35 U.S.C. 154(b) by 217 days.

(21) Appl. No.: 09/741,828

(22) Filed: Dec. 22, 2000

(65) Prior Publication Data

US 2002/0080413 A1 Jun. 27, 2002

(51) Int. Cl.[7] .............................................. G06F 13/00
(52) U.S. Cl. ....................... 709/206; 709/217; 709/223; 709/329
(58) Field of Search ................................ 709/203, 206, 709/217, 219, 223, 227, 313, 329; 358/400, 402, 474

(56) References Cited

U.S. PATENT DOCUMENTS

| | | | | |
|---|---|---|---|---|
| 5,293,256 | A | * | 3/1994 | Fukushima et al. ......... 358/468 |
| 6,047,327 | A | * | 4/2000 | Tso et al. .................... 709/232 |
| 6,049,801 | A | * | 4/2000 | Whitmyer, Jr. ............... 707/10 |
| 6,157,954 | A | * | 12/2000 | Moon et al. ................. 709/228 |
| 6,247,043 | B1 | * | 6/2001 | Bates et al. ................. 709/200 |
| 6,269,369 | B1 | * | 7/2001 | Robertson .................... 707/10 |
| 6,373,940 | B2 | * | 4/2002 | Shaffer et al. ......... 379/355.02 |
| 6,404,884 | B1 | * | 6/2002 | Marwell et al. ........ 379/265.13 |
| 6,442,241 | B1 | * | 8/2002 | Tsumpes ....................... 379/45 |
| 6,529,723 | B1 | * | 3/2003 | Bentley ....................... 455/405 |
| 6,564,264 | B1 | * | 5/2003 | Creswell et al. ............ 709/245 |

OTHER PUBLICATIONS

Gropper, U.S. patent Publication 2002/0049610, Apr. 2002.*
"Method for Automatic Directory Update upon Encounter of Specific Callee Messages", IBM technical Disclosure Bulletin, vol 37, Issue 1, p 391–392, Jan. 1994.*

* cited by examiner

Primary Examiner—Viet D. Vu
(74) Attorney, Agent, or Firm—Freedman & Associates

(57) ABSTRACT

A method is proposed for automatically updating and maintaining contact information for various contacts stored in a contact database without requiring an individual to manually update their contacts by using an automated reply process for the maintaining of contact information, as well as only requiring one individual to be a member of the service. Updating of the contacts with the automated reply process installed is more frequent.

35 Claims, 8 Drawing Sheets

| First Name | Middle Initial | Last Name |
|---|---|---|
|  |  |  |

Address Line 2

| |
|---|
| |

| City | State/Province |
|---|---|
|  |  |

| Zip or Postal Code | Country |
|---|---|
|  |  |

| Phone | Fax |
|---|---|
|  |  |

Fig 2a

METHOD AND SYSTEM FOR AUTOMATICALLY UPDATING CONTACT INFORMATION WITHIN A CONTACT DATABASE

FIELD OF THE INVENTION

This invention relates to a method of updating, maintaining and verifying contact information for various contacts held in a database and more particularly to an automated method of maintaining the contact information fields within a contact database without requiring an individual to manually update same.

BACKGROUND OF THE INVENTION

In the past, people have maintained contact lists on paper. The proverbial "black book" is a good example of a list of individuals and their contact information. Unfortunately, it is not uncommon that upon attempting to contact someone one discovers that the information is no longer accurate. This is of tremendous inconvenience, especially during emergency or time limited situations. Unfortunately, the task of maintaining a large contact list current is often too onerous for the few times one needs to contact each individual.

Therefore, whenever someone changes address, phone numbers or any other piece of contact information, there is a necessity for them to provide their contacts with the most current contact data. Conventional methods of accomplishing this task include sending updated information by email, via facsimile, or even by telephoning to contacts in an address book and making others aware that some information has changed and they need to manually update their contact list, which is time consuming.

A service offering automated updating of electronic contact information and ensuring most current contact information is offered by PeopleStreet through their World Wide Web site PeopleStreet.com. PeopleStreet addresses the difficult task of enabling people to stay connected to their many circles of contacts. The service provided by PeopleStreet manages the personal information and provides a dynamic link to all personal and professional relationships. This is performed by providing a method for each user to update their own address book entry, thereby automatically updating all the other user contacts of their new address book entry, wherever they may be.

Although the service that PeopleStreet provides does automate this tedious process, it does require that each party is a member of the service. In this manner information is updated from and to all parties subscribed to the service. This facilitates updating your personal information and being updated of others. A shortcoming of the method is that members of the address book, which are not already subscribed, still have to manually inform the subscribed user of their updated contact information according to the prior art updating method.

Contact.com also offers a similar type of contact service, which provides for the exchange of personal information. Once again, subscribed users decide which of their contacts are privileged to which information fields and as a result when the contact changes their personal information all the other address books linked to the contact are updated. This form of service requires the information to be stored on a central storage system. Although security may be strictly enforced, there are still security concerns because all personal information is accessible from outside the server.

It would be highly advantageous to provide a method for updating contact information in an automated fashion absent either security concerns or mandatory subscription to a service by each party within a given contact list.

SUMMARY OF THE INVENTION

The present invention seeks to automate the task of maintaining an up to date electronic contact address book. Advantageously the invention only requires membership by one user, enabling them to have their contact information automatically maintained. Provisions are made for an optionally installed program on the contact computer system allowing for the automatic maintenance of contact request messages sent from the user to the contacts such that contacts do not feel bombarded by the periodic messages sent by the user to ascertain the validity of the contact information.

BRIEF DESCRIPTION OF THE DRAWINGS

FIG. 2a is a representative of a form for receiving contact information;

DESCRIPTION OF THE INVENTION

Generally, according to the invention a method is provided for communicating between at least two parties for the exchange of personal contact information in such a manner that only one party is actively subscribed to the service and such that all of their electronic contact information is automatically updated. Thus, the need for split contact lists—those who are subscribed and those who are not—is obviated.

Figure 1:
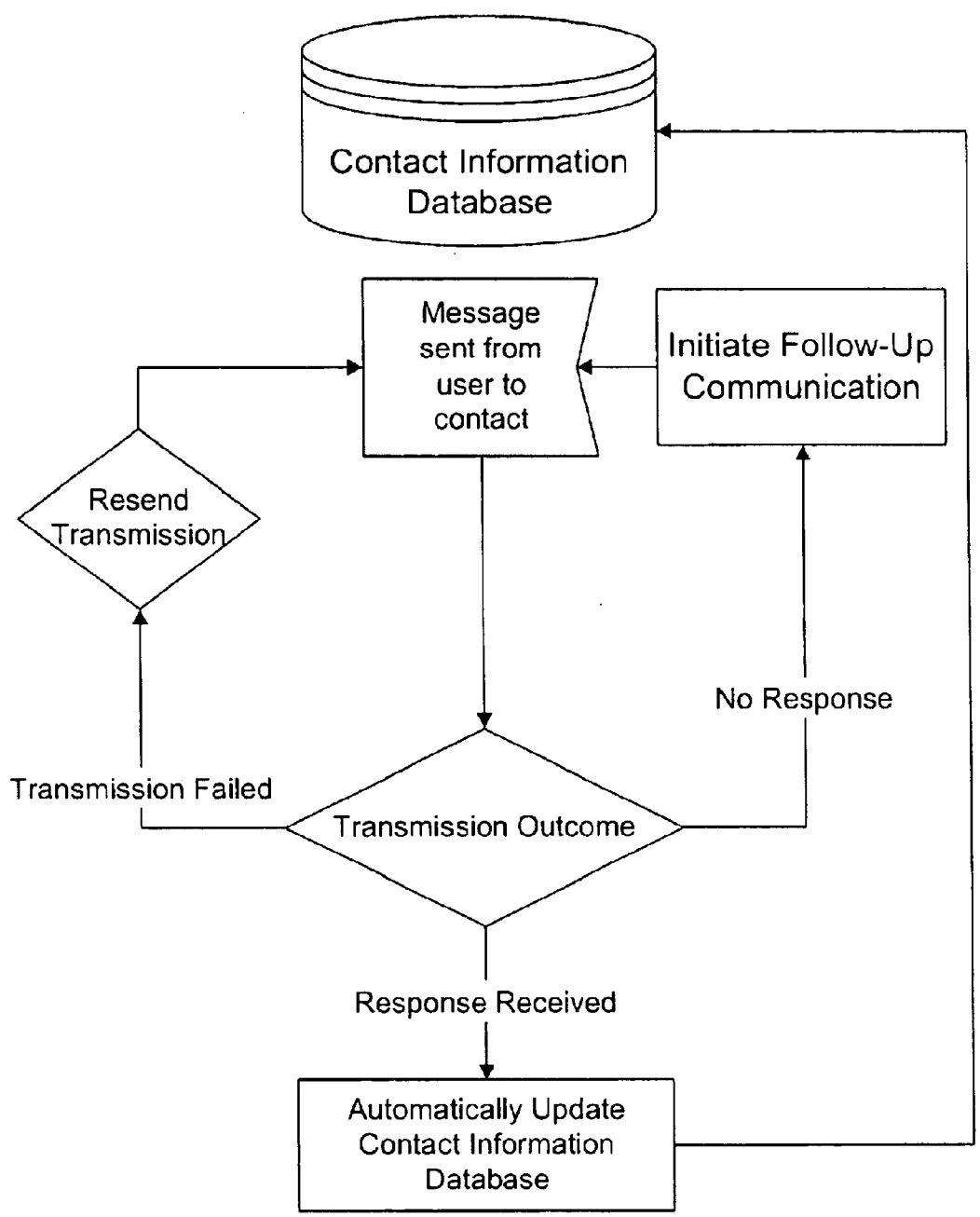
FIG. 1 is flow diagram according to an embodiment of the invention for updating contact information.

Referring to FIG. 1, a simplified flow diagram of a method according to the invention for updating contact information stored in an electronic form is shown. For example, a contact list is stored within a personal digital assistant in the form of an address, phone and email contact list. Typically, such a list is both portable and conveniently accessible. Convenient access includes the ability to search and group contacts within the list.

In order to update the contact list, the method is initiated by at least one user, referred to as "the user." The address book set-up by the user typically contains the contact information of all the contacts with which the user wishes to communicate. Preferably, the contents of the user's address book reside with the user, without having copies of personal data or the personal data of others being stored on a central server.

Upon initiating the method, a message is transmitted to each individual within the contact list requesting updated contact information. Typically, the message includes current contact information for the recipient in order to allow the recipient to indicate that no change has occurred. There are a number of possible outcomes to the step of transmission detailed above resulting in contacts classified into three groupings; valid contacts, suspect contacts and invalid contacts, as will be described in the three cases below.

First, the transmission may fail. Preferably, the transmission is resent to verify that the failure was not caused by a temporary problem. Upon determining that the failure was not causes by a temporary system problem through a predetermined number transmission resends, the contact is noted as invalid since it is evident that the contact information used is no longer current.

Second, the transmission is not responded to after several contact attempts and the transmission does not appear to fail, in which case it is assumed that the contact information is correct. After a predetermined number of communications with no response the contact is noted as being suspect and therefore a follow up using another method of communication is required.

Third, the transmission is responded to with either an indication that the contact information is unchanged, or that it has changed. This type of contact is noted as a valid contact and the contact information changes are automatically entered within the contact list.

Typically, the step of automatically entering the updated contact information involves parsing the response to determine contact information therein. Once the contact information is determined, it is compared to current contact information allowing the changes to be detected and then, the changes are implemented. Of course, when the response is in a known format, the step of comparing the contact information is obviated.

Advantageously, the contact information is only updated when the user requests an update, and as such, the user's information is not changed without their knowledge.

Figure 2:
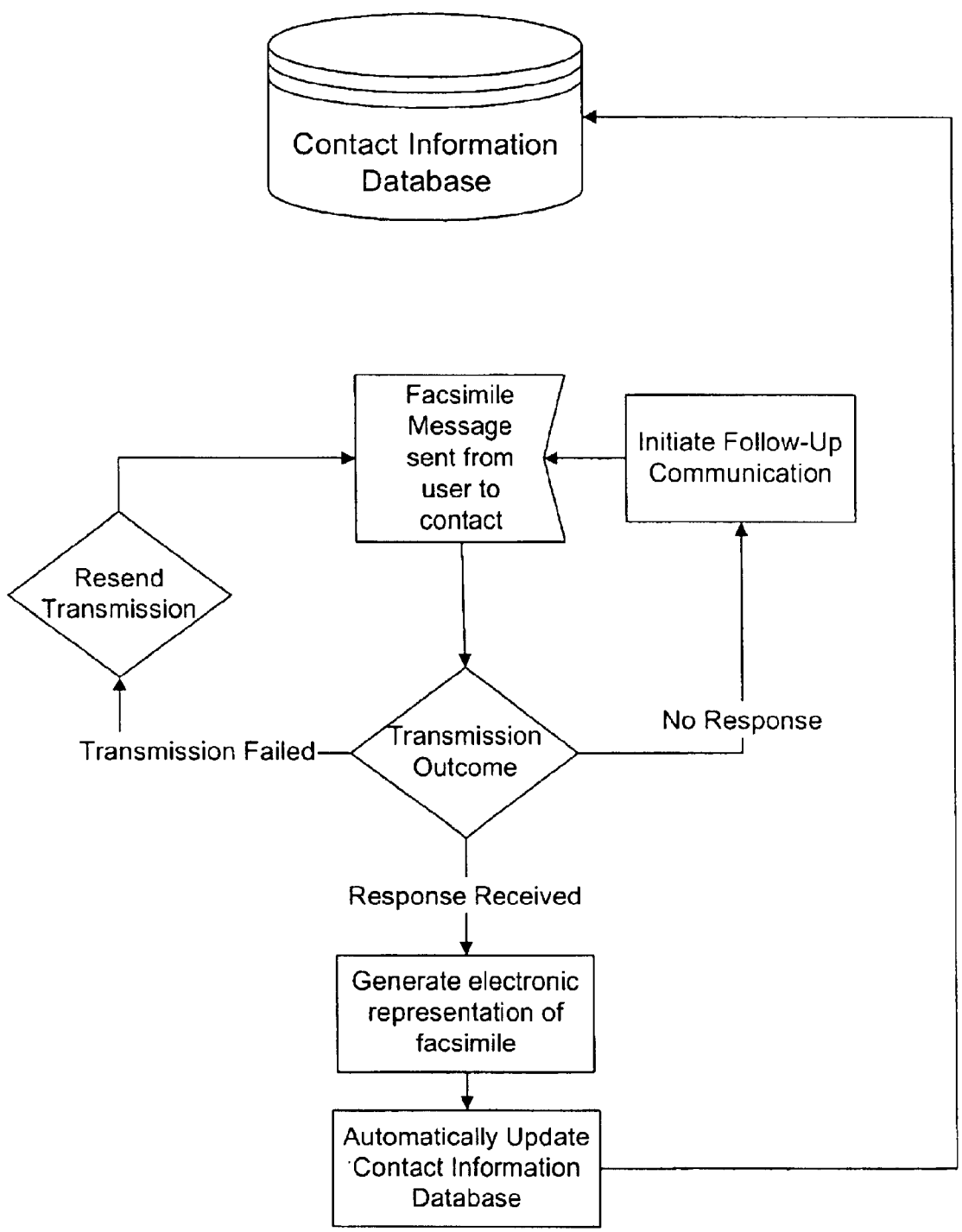
FIG. 2 is a flow diagram according to an embodiment of the invention for updating contact information in which a reply in the form of a facsimile message is sent.

In FIG. 2 another embodiment of the invention is disclosed where the method for updating contact information stored in an electronic form is shown. Upon initiating the method, a message is transmitted to each individual within the contact list requesting updated contact information by facsimile. Typically, the message includes current contact information for the recipient in order to allow the recipient to indicate that no change has occurred.

There are a number of possible outcomes to the step of transmission detailed above. However the one of primary concern is the receipt of a reply, in the case of a valid contact. The reply in this case is a facsimile message. In order to update the user contact list an electronic representation of this facsimile message is produced in the form of an electronic image of the facsimile document and the electronic representation is automatically parsed to detect contact information therein which is then automatically entered in appropriate fields in the user's contact list.

Typically after sending of an electronic facsimile message a reply is generated by the receiving system indicative of a successful transmission. However in some cases no form of reply is received from the contact system and the success of the transmission cannot be verified. As a result after some prescribed amount of time the facsimile message is resent to verify the contact information. If after a specified number of facsimile transmission attempts there is still no indication of a successful transmission from the contact system the contact is noted as suspect.

If an error reply is received from the contact system after transmission of an update request message, the message is resent to make sure the error was not caused by a system problem. After a predetermined number of unsuccessful contact attempts the contact is noted as invalid.

For example, a form such as that shown in FIG. 2a is used with known boxes indicated for different contact information. Parsing of manually entered data in specific boxes is well known in the art.

Figure 3A:
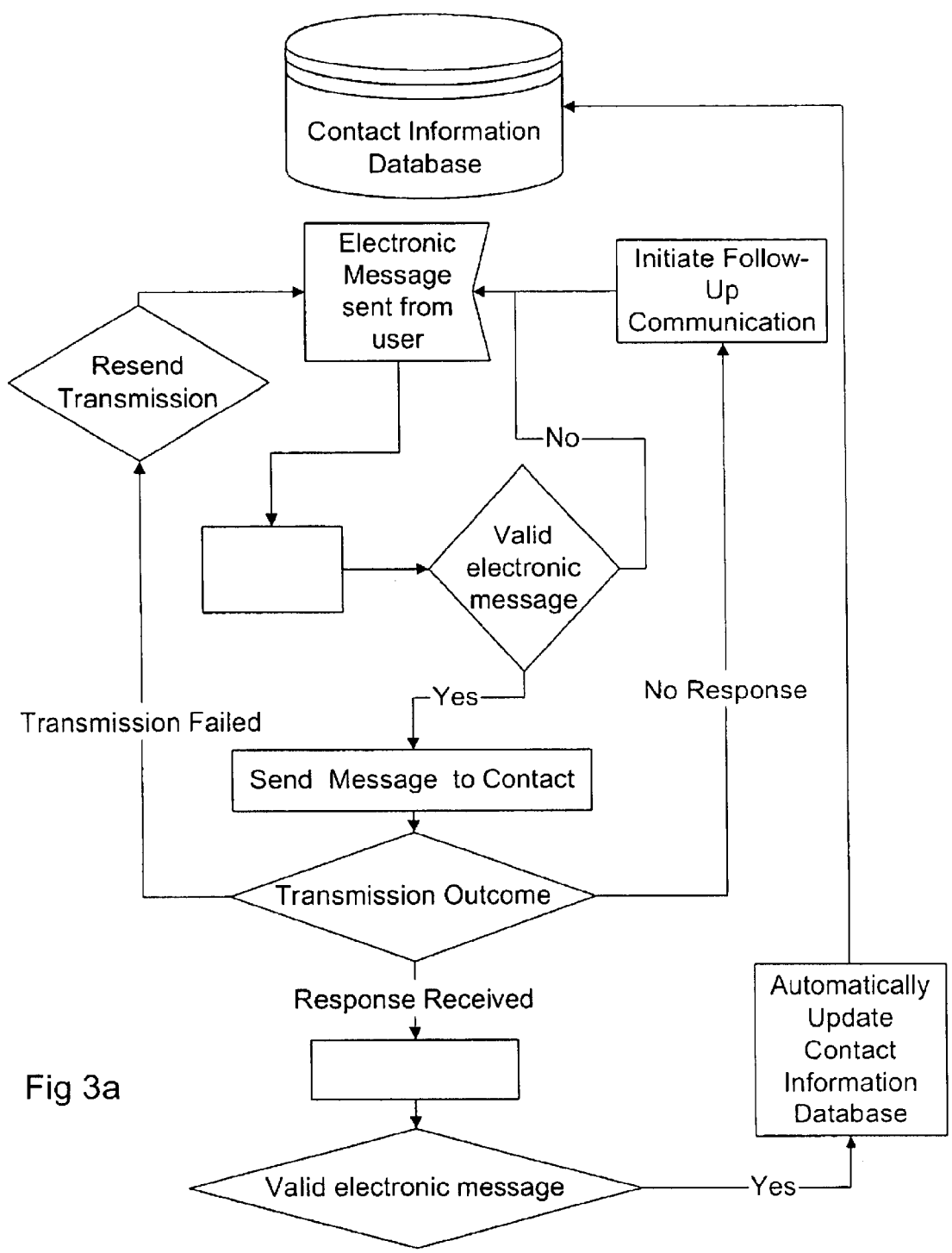
FIG. 3a is a simplified flow diagram according to an embodiment of the invention for use with the Internet.

Referring to FIG. 3a, a simplified flow diagram is shown wherein the transmission medium is the Internet. In order to update the contact list, a user initiates the method. Upon initiating the method, an electronic message is transmitted to the electronic address of each contact stored within a contact list. Once the electronic message is received on the contact system the message is verified before further action. Typically, the electronic message includes a subject line indicating a request for contact information update as well as current contact information for the recipient in order to allow the recipient to indicate for convenience that no change has occurred when this is the case. There are a number of possible responses the user system may receive and each is detailed below.

A first possible response is as follows: the transmission may fail and result in an undeliverable electronic message. In these cases, it is evident that either the contact information used is no longer current or the failed message delivery was caused by a temporary system or network problem. Preferably, when a delivery error occurs the electronic message is re-sent to verify that the failure was not caused by a temporary problem. Upon determining that the failure was not caused by a temporary system problem through a predetermined number transmission resends, the contact is noted as invalid since it is evident that the contact information used is no longer current.

A second possible response is as follows: the transmission is not responded to but no electronic message delivery failure is noted, in which case it is assumed that the contact information has been received and is correct. Of course, this is not necessarily the case, and optionally for important contacts, a follow up communication is initiated to verify the information. Preferably, a request for client contact is provided after a predetermined number of consecutive occurrences of this possible response from a same contact.

Typically in the second case there is no reply received from the contact within some predetermined time period. In this case the contact has no method of automatically replying to the electronic message or perhaps an error has occurred during transmission. After a predetermined number of communications with no response the contact is noted as being suspect and an indication is provided to the user to take action and determine the problem with this contact information. Preferably, the indication is generated only after a predetermined number of contact list update attempts with no response. This allows the above noted assumption that the contact information is correct to be verified at intervals when no other data is received from the contact.

In the third case a response to the transmitted electronic message is received. The response is assumed to have been transmitted electronically from the contact to an electronic address of the user and as a result the contact is noted as valid. Upon receipt of the response oil the user system the message is interpreted and when contact information within the message has changed, the user system automatically updates the contact list with the changes.

Figure 3B:
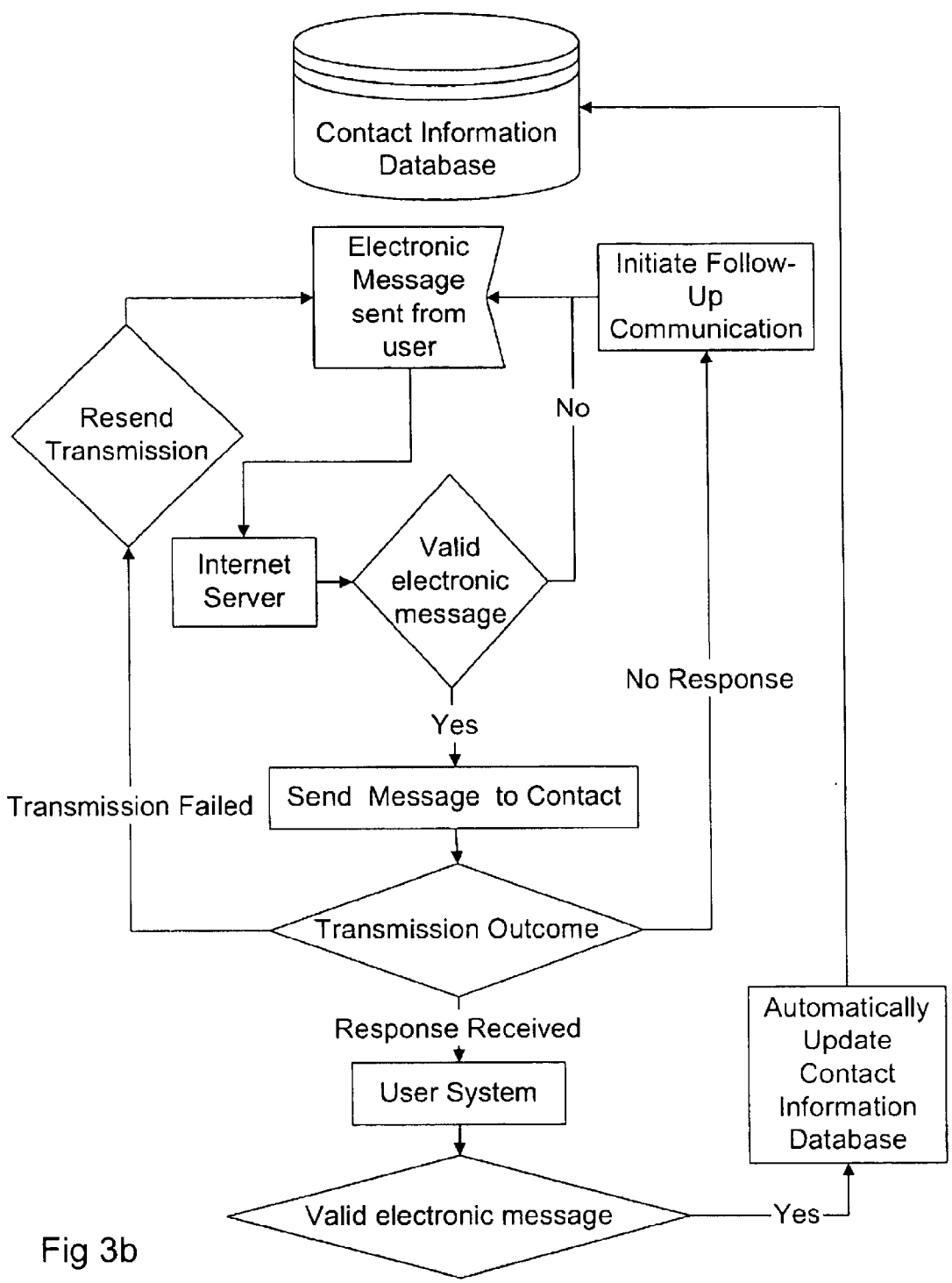
FIG. 3b is flow diagram according to an embodiment of the invention in which a user and a contact communicate via an Internet server.

Referring to FIG. 3b, a flow diagram is shown wherein the transmission medium is the Internet and communication between a user and a contact takes place via an Internet server. In order to update the contact list, a user initiates the method. Upon initiating the method, an electronic message is transmitted to the address of an Internet server where authenticity of the electronic message is verified before further action. Once verified, the server commences a process for updating the contact list information. The server transmits a message to each electronic address of contacts within the contact list. Typically, the electronic message includes a subject line indicating a request for contact information update as well as current contact information for the recipient in order to allow the recipient to indicate for convenience that no change has occurred when this is the case. There are a number of possible responses that the server may receive and each is detailed below.

A first possible response is as follows: the transmission may fail and result in an undeliverable electronic message. In these cases, it is evident that either the contact information used is no longer current or the failed message delivery was caused by a temporary system or network problem. Preferably, when a delivery error occurs the electronic message is re-sent to verify that the failure was not caused by a temporary problem. Upon determining that the failure was not caused by a temporary system problem through a predetermined number transmission resends, the contact is noted as invalid since it is evident that the contact information used is no longer current.

A second possible response is as follows: the transmission is not responded to but no electronic message delivery failure is noted, in which case it is assumed that the contact information has been received and is correct. Of course, this is not necessarily the case, and optionally for important contacts, a follow up communication is initiated to verify the information. Preferably, a request for client contact is provided after a predetermined number of consecutive occurrences of this possible response from a same contact.

Typically in the second case there is no reply received from the contact within some predetermined time period. In this case the contact has no method of automatically replying to the electronic message or perhaps an error has occurred during transmission. After a predetermined number of communications with no response the contact is noted as being suspect and an indication is provided to the user to take action and determine the problem with this contact information. Preferably, the indication is generated only after a predetermined number of contact list update attempts with no response. This allows the above noted assumption that the contact information is correct to be verified at intervals when no other data is received from the contact.

In the third case a response to the transmitted electronic message is received. The response is assumed to have been transmitted electronically from the contact to an electronic address of the user and as a result the contact is noted as valid. Upon receipt of the response on the user system the message is interpreted and when contact information within the message has changed, the user system automatically updates the contact list with the changes.

Advantageously, the contact information is only updated when the user requests an update, and as such, the user's information is not changed without their knowledge, but alternatively the information is updated without the user's knowledge.

In an embodiment, the user specifies at which time intervals to automatically update their contact information. In a properly functioning system with all of the contacts having a method of automatically responding to an update request the contact information is maintained at intervals sufficiently short to ensure that it is maintained most current at all times.

Clearly, such an embodiment would be obtrusive to each contact if a means for automatically replying is not supported. Also, when an automated reply process is available to each contact, the method is not obtrusive to the contacts and as such, is a convenient method for contact data update.

Figure 4:
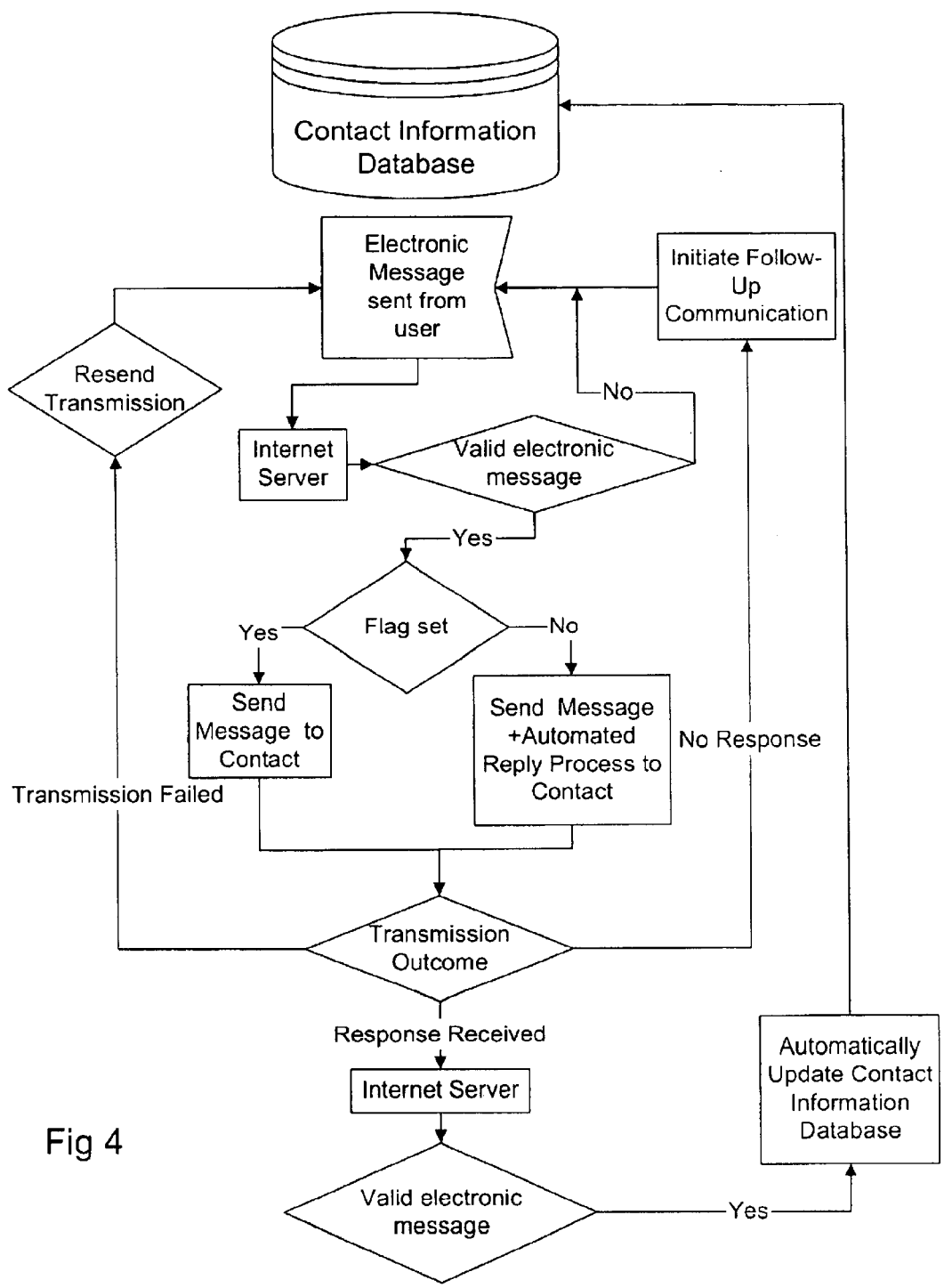
FIG. 4 is flow diagram according to an embodiment of the invention that demonstrates a method of automating a reply process.

Referring to FIG. 4, a method of automatically replying to an update request is shown. For the purpose of automating the reply process, a first time a contact is contacted in accordance with the method of FIGS. 3a,b for updating of their contact information, attached to the electronic message is an automated reply process for installation within their system. This process is optionally installed on the system by the contact or another person. Of course, the contact, at their discretion, may choose not to install the automated reply process. Once installed, the automated reply process acts to intercept update request electronic messages received so as to prevent an individual from feeling inconvenienced by future update requests.

Upon installation of the automated reply process, an indication of such is provided to the user. Once such an indication is received, a flag is set on the user system indicating same. Optionally, future update requests are then transmitted at more frequent time intervals from the user to the contact since the automated reply process has been installed. Preferably these intervals are specifiable by the user.

The contacts provide their contact information to the automated reply process through known input/output processes. For example, a window is provided with fill in boxes and the user fills in their contact information using a keyboard and a pointing device in the form of a mouse. The automated reply process stores the information, preferably in non-volatile storage, and upon intercepting an update request transmitted from the server, the automated reply process transmits the stored contact information to the server in a known format. Using a known format obviates a need to parse the received message since data is easily extractable based on the known format.

Figure 5:
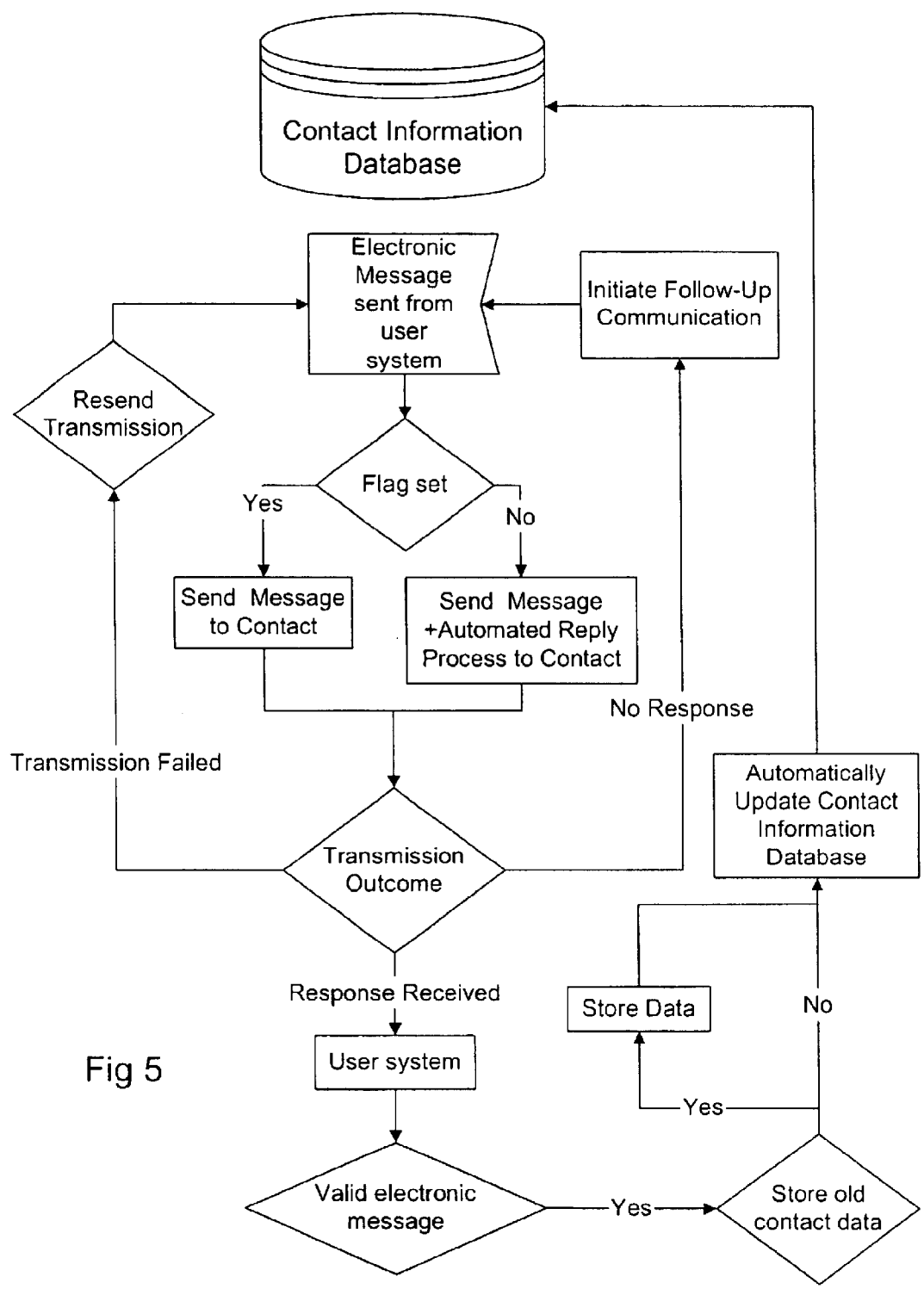
FIG. 5 is a flow diagram according to an embodiment of to invention in which a user contact database is updated and a user system acts as a server; and, FIG. 6 is a flow diagram according to an embodiment of the invention demonstrating a method of providing updated contact information automatically.

Referring to FIG. 5, a method of updating the user contact database is shown obviating the use of a server. A user system transmits electronic messages to systems associated with contacts contained in the user's contact list. Typically, the electronic messages are sent to an electronic address in the form of email message for each contact. The electronic messages request updated contact information. Here, a process similar to that described with reference to FIG. 4 is conducted but the user system acts as the server and automatically updates information stored therein. The user is notified of any new contact information changes requiring update on their electronic contact database through the above process. In the case when the contact list is stored on a personal digital assistant (PDA), upon connecting the PDA with the user system an option is available for updating the user contact list.

Figure 6:
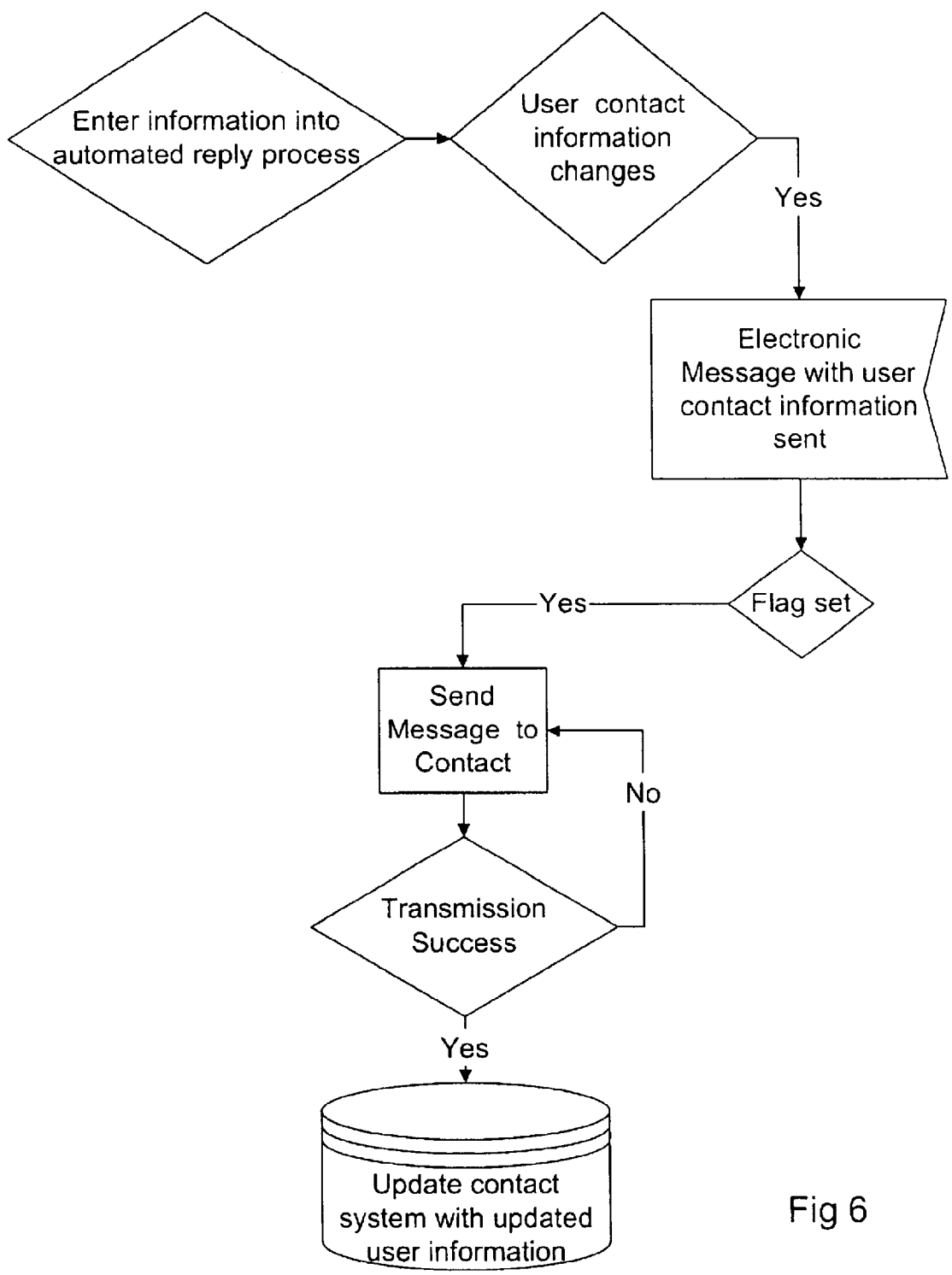

In FIG. 6 another embodiment of the invention is shown. Here a contact having an automated reply process installed updates their contact information whenever it changes. In accordance with the method of FIG. 5, this is beneficial since it allows the automated reply process to reply automatically with updated contact information. Here, the automated reply process also, automatically, transmits the updated contact information to each contact within their contact list. This allows for each contact to maintain up to the minute contact information. Of course, when each contact has an automated reply process installed, the electronic message containing the updated contact information is intercepted and the contact database on the contact's system is automatically updated therewith. Thus, a user's system serves two separate but related functions of polling contacts to ensure accurate updated contact information and transmitting contact information updates relating to the user's contact information upon a change thereto. The installation of automated reply processes on each system ensures that the entire contact database update process is fully transparent to each user other than a need to enter the contact information when it changes.

In the above-described system a single user has an electronic contact list with a number of electronic addresses of contacts stored within the list. As more contacts are initiated the size of the user contact list increases. Since each contact is prompted to use the contact update system and since each contact has numerous other contacts, the system grows exponentially without requiring any contacts to use the system and without requiring subscription to a central server when a peer to peer contact update method is employed. Thus, beginning with a single user, communications to other users on their contact list and then users on their contact lists and so forth. As such, the system is self-advertising and self propagating. That said, the system is not like a virus since each individual to whom an update request message is sent has an option of inaction and the general system continues to function predictably. Thus, the overall system is always under the control of participating users.

In another embodiment the invention also has the capability to, over time, rebuild a user contact list, in the case when a user contact list is damaged. Having the auto reply process installed on the contact systems results in a periodic electronic message sent from other contact systems to the user system, each requesting an update of contact information. Receiving this message at the user system results in the automated reply process storing the contact electronic address of the contact in the user's contact list. At the time for automatic updating of contacts stored in the user's contact list, the automated reply process transmits an electronic message to the electronic address of all contacts stored within the user contact list. Receiving a reply message from this contact results in the contact information being stored under that contact profile in the user contact list. The user contact list now contains the contact information for one of the contacts, which had been previously lost. Over time, as more update requests are communicated between the contacts and the user, the auto reply process will also serve to rebuild the damaged user contact list.

Another embodiment of the invention also covers the exchange of more than contact information between a user system and a contact system. Typically, the automated reply process takes care of the updating of contact information for both user and contact systems. However, the auto reply process can also be used for the updating of other data, for instance electronic data files. The user indicates a filename they are looking for and inputs this filename into the input process of the automated reply process. The automated reply process sends out an electronic message from the user system to contact systems with message contents indicating a request for the specific file. On the contact system the automated reply process traps and interprets the incoming electronic message. In this case the message is requesting a specific electronic data file. There are two possible reply messages from the contact system. If the file is stored on the contact system then an electronic message with the attached file is transmitted via the automated reply process to the user system. Otherwise if the file was not found then a message indicative of such is sent to the user system. Clearly this form of information exchange between a user and their contacts is useful for sending more than just contact information update request messages. Preferably, a handshake is initiated when a file is found thereby allowing the originating system to select a source for the file when more than one system has a copy thereof. In this way, a single file is not transmitted from numerous other systems.

Advantageously no information about the contact is stored on any server and the contact information only resides on the systems of the contact or the user.

Numerous other embodiments may be envisioned without departing from the spirit or scope of the invention.

What is claimed is:

1. A method comprising:
   updating an electronic contact information database, the contact information comprising address data, phone data, and electronic mail data of an individual including:
   a) sending at least one message requesting updated contact information comprising address data, phone data, and electronic mail data of an individual for at least one contact of a plurality of contacts stored within the electronic contact information database of a user; the at least one contact relating to other than the user; and
   b) upon receiving a return message with updated contact information for the individual and comprising at least one of address data, phone data, and electronic mail data of the individual from the at least one contact, automatically updating the contact information database with the updated contact information.

2. A method for updating an electronic contact information database as defined in claim 1 wherein the message is a facsimile message and comprising:
   analysing an electronic image of the received return facsimile message to automatically determine the updated contact information in an electronic form.

3. A method for updating an electronic contact information database as defined in claim 2 wherein analysing an electronic image of the received return facsimile message includes performing optical character recognition on the received return facsimile message.

4. A method for updating an electronic contact information database as defined in claim 3 comprising generating an electronic image of the received return facsimile message.

5. A method for updating an electronic contact information database as defined in claim 4 wherein upon receiving a transmission error when contacting the at least one contact, automatically storing an indication of a transmission error on association with the contact information in the contact information database.

6. A method for updating an electronic contact information database as defined in claim 5 comprising determining a success of sending and when sending fails, providing an indication of the contact and of the transmission failure.

7. A method for updating an electronic contact information database as defined in claim 6 wherein the contact request update transmission is resent to verify that the return message was not received due to a temporary communication failure.

8. A method for updating an electronic contact information database as defined in claim 1 wherein the message is an electronic message and comprising:
   automatically extracting from the received return electronic message updated contact information there.

9. A method for updating an electronic contact information database as defined in claim 8 wherein the user is a subscriber to a contact list update service and wherein the at least a contact is other than a user to the contact list update service.

10. A method for updating an electronic contact information database as defined in claim 9 comprising:
verifying the authenticity of each electronic contact information message received at the contact system.

11. A method for updating an electronic contact information database as defined in claim 8 wherein the electronic message comprises:
message body text containing contact information for at least one contact information field for verification.

12. A method for updating an electronic contact information database as defined in claim 8 wherein the electronic message comprises data for, when activated within a system, providing an automated reply process for automatically intercepting update request electronic messages and for automatically replying thereto.

13. A method for updating an electronic contact information database as defined in claim 12 wherein the automated reply process is electronic message platform independent.

14. A method for updating an electronic contact information database as defined in claim 12 wherein the automated reply process includes processes for entering and storing of contact data.

15. A method for updating an electronic contact information database as defined in claim 14 comprising:
entering contact information of the contact; and storing the contact information of the contact within memory accessible to the automated reply process.

16. A method for updating an electronic contact information database as defined in claim 14 wherein an electronic flag associated with the at least one contact is stored indicative of one of the automated reply process being installed on the contact system of the at least one contact.

17. A method for updating an electronic contact information database as defined in claim 16 where update request messages are sent more frequently to contacts with the electronic flag enabled.

18. A method for updating an electronic contact information database as defined in claim 17 where the information is only updated when the user initiates an update request.

19. A method comprising:
receiving a user request to update an electronic contact information database; updating the electronic contact information database, the contact information comprising address data, phone data, and electronic mail data including:
a) sending at least one message requesting updated contact information to a contact destination of at least one contact from a plurality of contacts stored within the electronic contact information database of a user; the at least one contact relating to other than the user; and
b) upon receiving a return message with updated contact information from the at least one contact, automatically updating the contact information database with the updated contact information.

20. A method for updating an electronic contact information database as defined in claim 19 wherein the message is a facsimile message and comprising:
analysing an electronic image of the received return facsimile message to automatically determine the updated contact information in an electronic form.

21. A method for updating an electronic contact information database as defined in claim 20 wherein analysing an electronic image of the received return facsimile message includes performing optical character recognition on the received return facsimile message.

22. A method for updating an electronic contact information database as defined in claim 21 comprising generating an electronic image of the received return facsimile message.

23. A method for updating an electronic contact information database as defined in claim 22 wherein upon receiving a transmission error when contacting the at least one contact, automatically storing an indication of a transmission error on association with the contact information in the contact information database.

24. A method for updating an electronic contact information database as defined in claim 23 comprising determining a success of sending and when sending fails, providing an indication of the contact and of the transmission failure.

25. A method for updating an electronic contact information database as defined in claim 24 wherein the contact request update transmission is resent to verify that the return message was not received due to a temporary communication failure.

26. A method for updating an electronic contact information database as defined in claim 19 wherein the message is an electronic message and comprising:
automatically extracting from the received return electronic message updated contact information therein.

27. A method for updating an electronic contact information database as defined in claim 26 wherein the user is a subscriber to a contact list update service and wherein the at least a contact is other than a user to the contact list update service.

28. A method for updating an electronic contact information database as defined in claim 27 comprising:
verifying the authenticity of each electronic contact information message received at the contact system.

29. A method for updating an electronic contact information database as defined in claim 26 wherein the electronic message comprises:
message body text containing contact information for at least one contact information field for verification.

30. A method for updating an electronic contact information database as defined in claim 26 wherein the electronic message comprises data for, when activated within a system, providing an automated reply process for automatically intercepting update request electronic messages and for automatically replying thereto.

31. A method for updating an electronic contact information database as defined in claim 30 wherein the automated reply process is electronic message platform independent.

32. A method for updating an electronic contact information database as defined in claim 30 wherein the automated reply process includes processes for entering and storing of contact data.

33. A method for updating an electronic contact information database as defined in claim 32 comprising:
entering contact information of the contact; and storing the contact information of the contact within memory accessible to the automated reply process.

34. A method for updating an electronic contact information database as defined in claim 32 wherein an electronic flag associated with the at least one contact is stored indicative of one of the automated reply process being installed on the contact system of the at least one contact.

35. A method for updating an electronic contact information database as defined in claim 34 where update request messages are sent more frequently to contacts with the electronic flag enabled.

* * * * *